(12) United States Patent
Massam et al.

(10) Patent No.: US 8,171,143 B2
(45) Date of Patent: May 1, 2012

(54) NETWORK DEVICE CONFIGURATION

(75) Inventors: Christopher James Massam, Auckland (NZ); Dennis Warren Monks, Auckland (NZ)

(73) Assignee: Yellowtuna Holdings Limited, Auckland (NZ)

( * ) Notice: Subject to any disclaimer, the term of this patent is extended or adjusted under 35 U.S.C. 154(b) by 933 days.

(21) Appl. No.: 10/540,328

(22) PCT Filed: Dec. 1, 2003

(86) PCT No.: PCT/NZ03/00265
§ 371 (c)(1),
(2), (4) Date: Jun. 21, 2005

(87) PCT Pub. No.: WO2004/059508
PCT Pub. Date: Jul. 15, 2004

(65) Prior Publication Data
US 2006/0168238 A1    Jul. 27, 2006

(30) Foreign Application Priority Data
Dec. 24, 2002   (NZ) ........................................ 523378

(51) Int. Cl.
*G06F 15/16* (2006.01)
*G06F 15/177* (2006.01)

(52) U.S. Cl. ......... 709/227; 709/219; 709/220; 709/229

(58) Field of Classification Search .................. 709/219, 709/220, 227, 229
See application file for complete search history.

(56) References Cited

U.S. PATENT DOCUMENTS

| | | | | |
|---|---|---|---|---|
| 5,297,192 A * | 3/1994 | Gerszberg | ...................... | 455/419 |
| 5,768,271 A * | 6/1998 | Seid et al. | ...................... | 370/389 |
| 5,826,000 A * | 10/1998 | Hamilton | ...................... | 714/4.1 |
| 6,012,088 A * | 1/2000 | Li et al. | .......................... | 709/219 |
| 6,029,196 A | 2/2000 | Lenz | | |
| 6,073,172 A * | 6/2000 | Frailong et al. | ................ | 709/222 |
| 6,161,133 A * | 12/2000 | Kikinis | .......................... | 709/220 |
| 6,366,563 B1 * | 4/2002 | Weldon et al. | ................. | 370/252 |
| 6,385,648 B1 | 5/2002 | Philippou et al. | | |
| 6,496,858 B1 | 12/2002 | Frailong et al. | | |
| 6,636,505 B1 | 10/2003 | Wang et al. | | |
| 6,687,245 B2 * | 2/2004 | Fangman et al. | ............. | 370/356 |
| 6,854,009 B1 * | 2/2005 | Hughes | .......................... | 709/220 |
| 7,043,537 B1 | 5/2006 | Pratt | | |
| 7,062,274 B2 * | 6/2006 | Shell et al. | ..................... | 455/445 |
| 7,099,338 B1 | 8/2006 | Lee | | |
| 7,111,054 B2 | 9/2006 | Lo | | |
| 7,127,049 B2 | 10/2006 | Godse et al. | | |
| 7,240,106 B2 * | 7/2007 | Cochran et al. | ................ | 709/222 |
| 7,313,384 B1 * | 12/2007 | Meenan et al. | ................ | 455/410 |
| 7,313,606 B2 * | 12/2007 | Donahue et al. | ............. | 709/220 |
| 2001/0001866 A1 | 5/2001 | Kikinis | | |

(Continued)

FOREIGN PATENT DOCUMENTS

WO    WO 01/86435    11/2001

(Continued)

*Primary Examiner* — Kevin Bates
*Assistant Examiner* — Robert B McAdams
(74) *Attorney, Agent, or Firm* — Young & Thompson

(57) ABSTRACT

A network device initially has no configuration data and is permitted only to query a known network address. From this address a server verifies the connection and authorizes another server to download to the network device the necessary configuration to carry out its purpose. This configuration may not be amended and is not retained on power loss. Any updates are carried out by a complete reload of configuration data.

18 Claims, 1 Drawing Sheet

U.S. PATENT DOCUMENTS

| | | | |
|---|---|---|---|
| 2002/0156898 A1* | 10/2002 | Poirier et al. | 709/227 |
| 2002/0161868 A1* | 10/2002 | Paul et al. | 709/221 |
| 2002/0174246 A1 | 11/2002 | Tanay et al. | |
| 2002/0184512 A1 | 12/2002 | Cardoso, Jr. | |
| 2002/0191548 A1* | 12/2002 | Ylonen et al. | 370/254 |
| 2003/0028625 A1 | 2/2003 | Sanjeev et al. | |
| 2003/0039244 A1 | 2/2003 | Owens | |
| 2003/0039268 A1 | 2/2003 | Chong | |
| 2003/0061323 A1* | 3/2003 | East et al. | 709/223 |
| 2003/0177385 A1 | 9/2003 | Price et al. | |
| 2004/0105444 A1 | 6/2004 | Korotin | |

FOREIGN PATENT DOCUMENTS

| | | |
|---|---|---|
| WO | WO 02/015517 | 2/2002 |
| WO | WO 02/056621 | 7/2002 |
| WO | WO 02/077808 | 10/2002 |

* cited by examiner

NETWORK DEVICE CONFIGURATION

TECHNICAL FIELD

This invention relates to connecting to the internet via a data connection which connection is remotely configurable as to access permissions. The connection may be via a modem or via a direct network connection.

BACKGROUND ART

Connection of network devices to a network typically require the attendance of a person on site to carry out the initial configuration of the device. For example, connection of a users business to the internet for access by internal parties may be by ADSL (Asymmetric Digital Subscriber Line) or some other connection protocol. Such a connection is typically via an ADSL modem and may include a router to route incoming data packets and a firewall to stop attempts to intrude into the users data. Typically the configuration of the router and firewall is done on site and will need to be changed on site to cater for variations over time in the users business. This involves a smaller user in expense as it requires specialised IT personnel to come on site to carry out the configuration.

Connections for higher volume users also typically include routers and firewalls connected via a plurality of modems for internet access. Currently these are mainly configured on site by the users skilled personnel. It is known, once the initial configuration is carried out, that the device may be remotely connected to via the network and final configuration carried out.

Typically such a network device will include an operating system of some sort which will be accessible by using an external name and password. Once the correct name and password is entered the remote user may modify the device settings, including settings for any router and firewall. This provides security problems, since it is possible for someone with knowledge of the name and password to alter the modem settings without authority.

It is therefore an object of the present invention to provide a network device which does not require any on site attendance for configuration of the network device but which is secure or which will at least provide the public with a useful choice.

PRIOR ART

It is known to provide remotely configured routers to avoid attendance on site, for instance U.S. Pat. No. 6,012,088 shows one such router, however such routers may provide a security problem in that if access is gained to them from one of the networks the router configuration can be changed, and may be changed in such a manner as to compromise security.

It is therefore an object of the present invention to provide an internet connection which does not require on site attendance for configuration of router or firewall but which does provide complete security of the configuration or which will at least provide the public with a useful choice.

DISCLOSURE OF INVENTION

Accordingly, the invention may broadly be said to consist in a network device having operating software but no configuration data allowing it to carry out its intended purpose which network device is remotely programmable with configuration data as a whole but which network device or operating software has no facility to allow any incremental change of configuration data.

Preferably the device configuration data is held in random access memory (RAM) and is lost when no network device supply voltage is present.

Preferably the device software contains a routine which on initialisation attempts to contact a remote verification authority to authorise retrieval of configuration data from a configuration authority.

Preferably the device software contains only the routine for contacting the remote verification authority and receiving data from the remote configuration authority.

Preferably the contact with the remote verification authority is subject to encryption.

Preferably the device initially contains an input filter which will only receive configuration data from a specified remote configuration authority address.

Preferably the device is a router which is integral with a modem.

Preferably the modem is an asymmetric digital subscriber line (ADSL) modem.

Alternatively the invention may be said to lie in the method of configuring a network device which loses its configuration data on power loss comprising providing a network device without user configuration data, providing within the network device a routine which securely contacts a remote verification authority, and downloading from a remote configuration authority authorised by the remote verification authority the entire configuration data.

Preferably the network device is a router.

Preferably the router is part of an ADSL modem.

Preferably the network device is capable of being configured only by remote download of the complete configuration data.

Preferably the network device routine which contacts the remote verification authority carries out any information transfer using secure encryption.

Preferably the secure encryption uses a public key encryption method.

Preferably the private key for the network device is provided by a device temporarily connected to the network device.

Preferably the temporarily connected device is a USB memory device.

Preferably the configuration data is also lost from the network device on any intrusion attempt.

Alternatively the invention may be said to consist in a method of providing communication between two network devices of unknown network address wherein each device is required to download its configuration parameters from a server at a known network address each time the device is initialised, the devices allocated network addresses are stored at server, the server may be queried for the allocated network addresses of the two network devices, and wherein communications can be initiated between the two network addresses from this data.

Preferably the two network devices are routers.

Preferably the routers form part of ADSL modems.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

BRIEF DESCRIPTION OF DRAWINGS

One preferred form of the invention will now be described with reference to the accompanying drawings in which.

DETAILED DESCRIPTION

Figure 1:
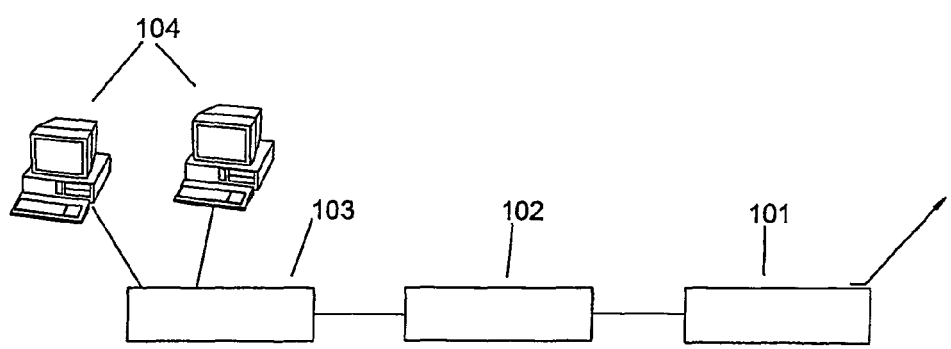
FIG. 1 shows a block diagram of one form of network device.

With reference to FIG. 1, the diagram shows a network device consisting of an ADSL connection via a modem 101 to a firewall 102 and router 103 which distributes the data to devices such as PC's 104. The modem acts to convert packets from the firewall router into a form suitable for carrying information over the internet. The firewall 102 acts to restrict what information packets may be transferred into the users system and the router 103 acts to distribute packets to an internal user in accordance with the packet address.

In practice the modem, firewall and router may be combined into a single item of equipment with the configuration data held in a common internal location.

According to the current invention the modem, or firewall or router, has configuration information, which is internally held, but this information is not capable of being changed by any routine or subroutine held in the modem. The only way in which this information can be altered is to download an updated configuration from a remote authority. The only remote authority which the modem recognises are ones which are hard coded into the internal software, and the only action the modem can take as regards configuration is to contact the remote authority in a secure manner. This action can occur either at power on or if an intrusion is detected, or it can be triggered by a specific remote query.

Thus the modem may have instructions in read only memory (ROM) which instruct it to call an address such as 203.17.209.32 upon initial power on, but to otherwise provide no routing of incoming or outgoing data packets. Once the designated address is called and a verification established for the network device from a verification service a secure connection between the modem and the address is set up, preferably by the exchange of encrypted passwords through a secure sockets layer (SSL), and the modems' required configuration is downloaded from a configuration server. This provides the routing configuration required and leaves the modem in a secure state.

The configuration may include any connection data and passwords for connecting the modem to an internet service provider (ISP), and the modem may automatically carry out the connection once configured.

Where the connection between the modem and the server is such that it does not support full public key encryption the authentication for the modem may be provided by a removable key, for instance a USB key.

Should an attempt be made to configure or reconfigure the modem without using the correct encryption from the correct address the modem initialisation software is intended to be re-triggered, resulting in a complete download of the required configuration.

Figure 2:
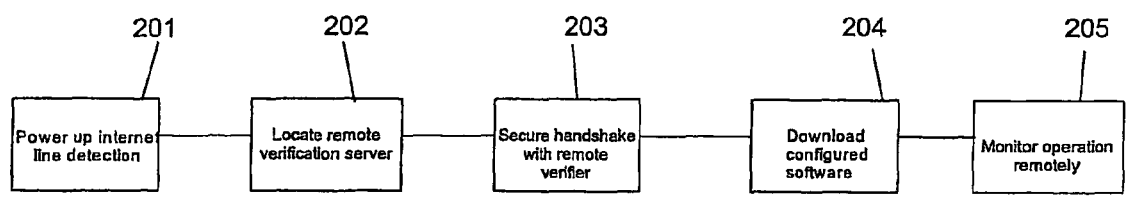
FIG. 2 shows a flow diagram of the initial mediation procedure which downloads to the network device.

FIG. 2 shows how the equipment on powering on at 201 searches for an internet connection at, and on detecting one sends a particular data stream to the remote verification authority at 202, 203 which detects the identity of the calling equipment, and from this can look up the customers identity, the equipments current state, and its desired state as required by the customer. The remote authority then connects a configuration server and initiates the procedure to securely update the equipment at 204 with the desired configuration changes and with the software required to carry out the desired functions. The remote configuration authority can then continue to receive operation reports from the equipment at scheduled intervals.

In accordance with the present invention the modem, firewall and router are normally provided as a single equipment item which may also include a hub or switch. This item is installed on the users premises, provided with a connection to the internet and powered up. On detecting the internet connection the equipment identifies itself to the remote verification authority, the only action it is capable of taking.

The remote authority will detect the identification of the calling equipment and validate this against a database of equipment whose setups are stored. If the equipment ID is found the remote authority may then, in secure mode, connect the calling equipment to a configuration service and download to the equipment such configuration details and software as will allow it to perform the desired router/firewall functions.

Preferably the equipment configuration template is held by the remote authority, who may either make changes in it or allow the user to make changes in it via secure internet access. Such changes may be downloaded to the equipment in the same manner as the initial configuration data, though in most instances the remote authority will send a code to the equipment which forces it to reload the configuration.

The firewall and router may maintain the normal statistics of packets passed, addresses sent to or received from, intrusion attempts etc. and may, either on prompting or on schedule, send these details to the configuration authority for storage and possible analysis.

The firewall or router may be set up to pass information through desired ports and may be set to configure these ports on call. Thus if a client requires a VPN connection between two locations which do not have a specific allocated IP address (as for instance a small office served by an ADSL without a fixed address) the client requests the VPN connection from the remote authority, which will have stored the network address of any modem of the inventive type. The remote authority then notifies the network devices of the required connection and the devices then create the VPN connection. Thus a VPN connection can be established between two modems which did not initially know each others addresses.

While the invention is described in relation to an ADSL modem the invention is equally as applicable to the configuration of a PC, a router of any type, a mobile phone or PDA or other similar equipment.

INDUSTRIAL APPLICABILITY

The invention is applicable to the guaranteeing of the configuration of a network device, to prevent the compromising of data passing through that device, or the extraction of data in an unintended manner by that device.

Thus it can be seen that at least the preferred form of the invention provides an item of equipment which can be remotely configured for network device set up purposes.

The invention claimed is:

1. A method of providing a VPN communication between two or more network devices of unknown network address at least a first one of which network devices does not initially know the other network devices internet network addresses, the method comprising:

providing a verification authority connected to the internet remote from the two or more network devices and remote from an internet service provider providing an internet connection to each of the two or more network devices, the verification authority verifying the identity of the two or more internet network devices;

providing a configuration server connected to the internet remote from the two or more network devices and remote from the internet service provider providing an internet connection to each of the two or more network devices, the configuration server supplying to each verified internet device the entire configuration data for that verified internet device;

providing each of the two or more network devices free of provision to permanently store the user configuration data, each of the devices containing configuration information only sufficient to connect the devices to the internet service provider to request a first IP address, and using that first IP address to connect to the remote verification authority at a designated internet address, providing within each of the two or more network devices, a routine which securely contacts the remote verification authority, providing the identity of the network device, and using the designated internet address of that remote verification authority, and subsequently downloading from a remote configuration authority authorized by the remote verification authority the entire configuration data each time the device is initialized, for one of the two or more internet network devices, each time that device is initialized, reloading that device with the downloaded configuration data, each of the two or more network devices creating a private network in a downlink separate from end user devices in the created private network; and storing the allocated internet network address of the network device at the verification authority, repeating the process for each of the other network devices so that each of the other network devices downloads from the remote configuration server authorized by the remote verification authority the entire configuration data for that particular internet network device each time that particular device is initialized and reloading that particular device with the downloaded configuration data, and storing the allocated internet network address for that particular device at the verification authority, and initiating a VPN communication between two or more of the network devices, by sending an instruction from the verification authority to one of the network devices by supplying to that network device the allocated internet address of at least one of the other network devices so that the recipient internet device can communicate with the other network device.

2. The method as claimed in claim 1, wherein the two or more network devices are routers.

3. The method as claimed in claim 1, wherein the routers form part of ADSL modems.

4. The method as claimed in claim 1, wherein the configuration data is downloaded as a single transaction.

5. The method as claimed in claim 1, wherein the configuration data is lost when the network device loses power.

6. The method as claimed in claim 4, wherein the configuration data remains unchanged for the duration of the network devices powered on cycle.

7. The method as claimed in claim 4, wherein the configuration data is only downloaded upon a power up sequence.

8. A method of providing a VPN communication over the internet between two or more internet network devices having an allocated or other internet address at least a first one of which network devices does not initially know the other network devices internet network addresses, the method comprising:

providing a remote authority connected to the internet remote from the one or more network devices and remote from an internet service provider providing an internet connection to each of the two or more network devices, the verification authority verifying the identity of the one or more internet network devices; and requiring each of the network devices to communicate with the remote authority to inform the remote authority of the current public IP address of the network device, and storing the current public IP address of each network device at the remote authority, wherein a VPN can be initiated from the remote authority by sending a request to at least one of the network devices to connect to another of the network devices by sending to the at least one network device the current public IP addresses of the other network devices to which the at least one network device is to be connected, wherein each of the two or more network devices free of any means to permanently store its private configuration data instead is provided with configuration information only sufficient to contact only the internet service provider to request a first IP address, and using that first IP address to connect to the remote authority at a designated internet network address of the remote authority, and subsequently downloading from a remote configuration service authorized by the remote authority the entire configuration details and software for the specific internet network device each time the device is initialized, each of the two or more network devices creating a private network in a downlink separate from end user devices in the created private network.

9. A method as claimed in claim 8, wherein a user sends a request via secure internet access to the remote authority to create a VPN between some or all of the network devices whose addresses have been stored at the remote authority.

10. A method as claimed in claim 9, wherein each of the two or more network devices communicate with the remote authority on schedule to send statistics for storage and analysis.

11. A method as claimed in claim 10, wherein each of the two or more network devices are routers.

12. A method as claimed in claim 11, wherein the routers form part of ADSL modems.

13. A method as claimed in claim 12, wherein the configuration details and software are downloaded as a single transaction.

14. A method as claimed in claim 13, wherein the configuration details and software are lost when the network device loses power.

15. A method as claimed in claim 14, wherein the configuration details and software remain unchanged for the duration of the network devices "powered on" cycle.

16. A method as claimed in claim 15, wherein the configuration details and software are only downloaded upon a power up sequence.

17. A method as claimed in claim 13, wherein the remote authority sends a code to at least one of the network devices which forces it to download the configuration details and software.

18. A method as claimed in claim 13, wherein the user configuration details and software can be changed by a user via a secure internet connection to the remote authority.

* * * * *